(12) United States Patent
Yuan

(10) Patent No.: US 11,064,174 B2
(45) Date of Patent: Jul. 13, 2021

(54) WHITE BALANCE PROCESSING METHOD AND APPARATUS

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/629,896

(22) PCT Filed: Jul. 3, 2018

(86) PCT No.: PCT/CN2018/094213
§ 371 (c)(1),
(2) Date: Jan. 9, 2020

(87) PCT Pub. No.: WO2019/011154
PCT Pub. Date: Jan. 17, 2019

(65) Prior Publication Data
US 2020/0396435 A1     Dec. 17, 2020

(30) Foreign Application Priority Data
Jul. 10, 2017     (CN) .......................... 201710557843.5

(51) Int. Cl.
*G06K 9/00*     (2006.01)
*H04N 9/73*     (2006.01)
(Continued)

(52) U.S. Cl.
CPC .......... *H04N 9/735* (2013.01); *G06K 9/00228* (2013.01); *G06T 7/50* (2017.01);
(Continued)

(58) Field of Classification Search
CPC .......... H04N 9/735; H04N 9/643; H04N 9/68; H04N 9/045; H04N 9/04; H04N 9/73;
(Continued)

(56) References Cited

U.S. PATENT DOCUMENTS

| 8,089,525 | B2 | 1/2012 | Takayama |
| 8,908,976 | B2 | 12/2014 | Kawanishi |

(Continued)

FOREIGN PATENT DOCUMENTS

| CN | 101472188 A | 7/2009 |
| CN | 101527860 A | 9/2009 |

(Continued)

OTHER PUBLICATIONS

English translation of the Written Opinion of the International Search Authority in the international application No. PCT/CN2018/094213, dated Sep. 25, 2018.

(Continued)

*Primary Examiner* — Jose L Couso
(74) *Attorney, Agent, or Firm* — Ladas & Parry LLP

(57) ABSTRACT

The present application provides a white balance processing method and apparatus. The method comprises: recognizing a portrait region in an image; calculating a target white balance gain value according to the area occupied by the portrait region in the image; and performing white balance processing on the image according to the target white balance gain value. The present application resolves the problems of poor user experience due to inaccurate image color restoration caused by a small area proportion of a human face region in an image during white balance adjustment according to the white balance gain value determined according to the area occupied by the human face in the case of a long photography distance.

18 Claims, 5 Drawing Sheets

(51) Int. Cl.
*G06T 7/50* (2017.01)
*G06T 7/90* (2017.01)
*H04N 9/64* (2006.01)
*H04N 9/68* (2006.01)

(52) U.S. Cl.
CPC ............... *G06T 7/90* (2017.01); *H04N 9/643* (2013.01); *H04N 9/68* (2013.01); *G06T 2207/30201* (2013.01)

(58) Field of Classification Search
CPC ...... H04N 9/3152; H04N 1/628; H04N 1/608; H04N 1/4072; H04N 5/23219; H04N 5/235; H04N 5/232; H04N 5/23229; H04N 5/225; H04N 5/23293; H04N 5/23245; G06T 7/50; G06T 7/90; G06T 7/13; G06T 7/60; G06T 5/00; G06T 5/001; G06T 2207/30201; G06K 9/00228; G06K 9/00281; G06K 9/00; G06K 9/62; G06K 9/6201; G06K 9/00234; G06K 9/32; G06K 9/6223; G06K 9/00221; G06K 9/0061; G06K 9/4652; G06K 9/6277; G06F 17/30; G06F 16/583; G06F 16/5838
See application file for complete search history.

(56) References Cited

U.S. PATENT DOCUMENTS

| | | | |
|---|---|---|---|
| 9,106,834 B2 | 8/2015 | Hoda | |
| 9,398,280 B2 | 7/2016 | Nikkanen | |
| 10,911,681 B2* | 2/2021 | Noguchi | H04N 5/232 |
| 2004/0208363 A1 | 10/2004 | Berge | |
| 2006/0284991 A1* | 12/2006 | Ikeda | H04N 1/6027 |
| | | | 348/223.1 |
| 2007/0031060 A1* | 2/2007 | Okada | H04N 9/735 |
| | | | 382/274 |
| 2007/0085911 A1* | 4/2007 | Nakamura | H04N 9/735 |
| | | | 348/223.1 |
| 2007/0147701 A1 | 6/2007 | Tanaka | |
| 2008/0170129 A1 | 7/2008 | Yi | |
| 2009/0002518 A1* | 1/2009 | Nakamura | H04N 9/735 |
| | | | 348/223.1 |
| 2009/0002519 A1* | 1/2009 | Nakamura | H04N 9/735 |
| | | | 348/223.1 |
| 2009/0034837 A1 | 2/2009 | Kato | |
| 2009/0167892 A1 | 7/2009 | Takayama | |
| 2012/0200729 A1 | 8/2012 | Hoda | |
| 2013/0057726 A1* | 3/2013 | Shimizu | H04N 9/643 |
| | | | 348/224.1 |
| 2013/0058579 A1 | 3/2013 | Kawanishi | |
| 2013/0278793 A1* | 10/2013 | Shimizu | H04N 1/6086 |
| | | | 348/223.1 |
| 2015/0054980 A1 | 2/2015 | Nikkanen | |
| 2015/0326842 A1* | 11/2015 | Huai | H04N 9/646 |
| | | | 348/223.1 |
| 2017/0163953 A1* | 6/2017 | Wang | H04N 5/23219 |
| 2020/0053332 A1* | 2/2020 | Seok | G06K 9/00 |
| 2020/0413020 A1* | 12/2020 | Huai | H04N 5/23229 |

FOREIGN PATENT DOCUMENTS

| | | |
|---|---|---|
| CN | 102629977 A | 8/2012 |
| CN | 102906790 A | 1/2013 |
| CN | 104735362 A | 6/2015 |
| CN | 105409211 A | 3/2016 |
| CN | 105894458 A | 8/2016 |
| CN | 106303250 A | 1/2017 |
| CN | 106851238 A | 6/2017 |
| CN | 106909911 A | 6/2017 |
| CN | 107277479 A | 10/2017 |
| CN | 107343189 A | 11/2017 |

OTHER PUBLICATIONS

Supplementary European Search Report in the European application No. 18831012.2 dated May 12, 2020.
Second Office Action of Chinese application No. 201710557843.5, dated Feb. 19, 2019.
International Search Report in the international application No. PCT/CN2018/094213, dated Sep. 25, 2018.
First Office Action of Chinese application No. 201710557843.5, dated Aug. 14, 2018.
Notice of Allowance of the Chinese application No. 201710557843.5, dated May 5, 2019.
First Office Action of the European application No. 18831012.2, dated Feb. 22, 2021.
Office Action of the Indian application No. 202017005576, dated Apr. 8, 2021.

* cited by examiner

WHITE BALANCE PROCESSING METHOD AND APPARATUS

CROSS-REFERENCE TO RELATED APPLICATION

This application is an application under 35 U.S.C. 371 of International Application No. PCT/CN2018/094213 filed on Jul. 3, 2018, the entire contents of which are incorporated herein by reference.

This application claims priority to Chinese Patent Application No. 201710557843.5, filed by Guangdong OPPO Mobile Telecommunications Corp. Ltd. on Jul. 10, 2017 and entitled "White Balance Processing Method and Apparatus", the contents of which are hereby incorporated by reference in its entirety.

TECHNICAL FIELD

The disclosure relates to the technical field of terminals, and particularly to a white balance processing method and device.

BACKGROUND

Along with the progress of sciences and technologies and development of image processing technologies, photographing technologies for mobile terminals (for example, smart phones and personal digital assistants) have also changed rapidly, including image processing software for processing Automatic White Balance (AWB) as well as automatic white balance for a face, i.e., FACE AWB.

However, during practical use, when FACE AWB is applied to a rear camera for portrait shooting, the color accuracy of the shot photo is still low after the photo is adjusted by the FACE AWB, which results in white balance regulation error and poor user experience.

SUMMARY

The disclosure is intended to solve one of the technical problems in a related art at least to a certain extent.

To this end, the disclosure discloses a white balance processing method, which solves the problems of inaccurate image color reproduction and poor user experience caused by the fact that an area proportion of a face region in an image is relatively low when the white balance regulation is performed according to a white balance gain value determined based on an area occupied by the face region in condition of a relatively long shooting distance.

The disclosure also discloses a white balance processing device.

The disclosure also discloses a computer device.

The disclosure also discloses a computer-readable storage medium.

The disclosure also discloses a computer program product.

A first aspect of embodiments of the disclosure discloses, a white balance processing method, which may include the following operations.

A portrait region in an image is identified.

A target white balance gain value is calculated according to an area occupied by the portrait region in the image.

White balance processing is performed on the image according to the target white balance gain value.

In the white balance processing method of the embodiments of the disclosure, the portrait region in the image is identified, the target white balance gain value is calculated according to the area occupied by the portrait region in the image, and white balance processing is performed on the image according to the target white balance gain value. This solves the technical problems of inaccurate image color reproduction and poor user experience caused by the fact that an area proportion of a face region in an image is relatively low when the white balance regulation is performed according to a white balance gain value determined based on an area occupied by the face region in condition of a relatively long shooting distance.

A second aspect of the embodiments of the disclosure discloses a white balance processing device, which may include a recognition module, a calculation module and a white balance module.

The recognition module may be configured to identify a portrait region in an image.

The calculation module may be configured to calculate a target white balance gain value according to an area occupied by the portrait region in the image.

The white balance module may be configured to perform white balance processing on the image according to the target white balance gain value.

In the white balance processing device of the embodiments of the disclosure, the recognition module is configured to identify the portrait region in the image, the calculation module is configured to calculate the target white balance gain value according to the area occupied by the portrait region in the image, and the white balance module is configured to perform white balance processing on the image according to the target white balance gain value. This solves the technical problems of inaccurate image color reproduction and poor user experience caused by the fact that an area proportion of a face region in an image is relatively low when the white balance regulation is performed according to a white balance gain value determined based on an area occupied by the face region in condition of a relatively long shooting distance.

A third aspect of the embodiments of the disclosure discloses a computer device, which may include a memory, a processor and a computer program stored in the memory and capable of running in the processor. The processor executes the program to implement the white balance processing method of the first aspect of the embodiments.

A fourth aspect of the embodiments of the disclosure discloses a computer-readable storage medium, in which a computer program may be stored. The program is executed by a processor to implement the white balance processing method of the first aspect of the embodiments.

A fifth aspect of the embodiments of the disclosure discloses a computer program product. An instruction in the computer program product is executed by a processor to execute the white balance processing method of the first aspect of the embodiments.

Additional aspects and advantages of the disclosure will be partially presented in the following descriptions and partially become apparent from the following descriptions or get understood by implementing the disclosure.

BRIEF DESCRIPTION OF DRAWINGS

The abovementioned and/or additional aspects and advantages of the disclosure will become apparent and easy to understand from the descriptions made to the embodiments below in combination with the drawings.

DETAILED DESCRIPTION

Figure 1:
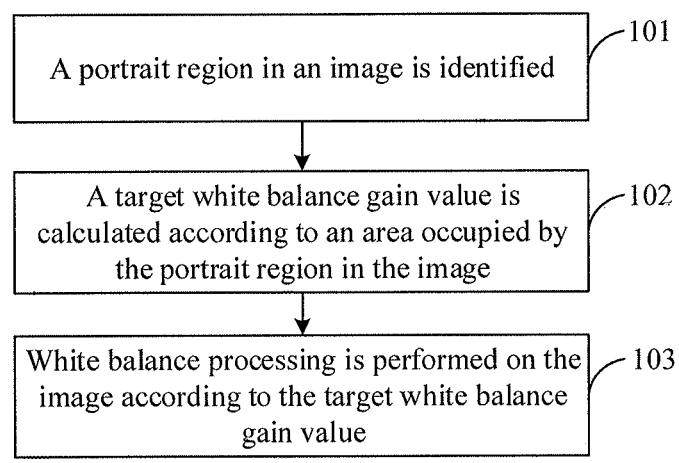
FIG. 1 is a schematic flowchart of a white balance processing method according to an embodiment of the disclosure.

The embodiments of the disclosure will be described below in detail.

Examples of the embodiments are illustrated in the drawings and the same or similar reference signs always represent the same or similar components or components with the same or similar functions. The embodiments described below with reference to the drawings are exemplary and intended to explain the disclosure and should not be understood as limits to the disclosure.

A white balance processing method and device of the embodiments of the disclosure will be described below with reference to the drawings.

FIG. 1 is a schematic flowchart of a white balance processing method according to an embodiment of the disclosure. The method of the embodiment may be executed by a terminal with a data processing function, for example, a smart phone, a pad and a personal computer. As illustrated in FIG. 1, the method includes the following operations.

In 101, a portrait region in an image is identified.

The portrait region includes a face region and a body region. That is, an area of the face region is smaller than an area of the portrait region.

Specifically, the image is obtained by shooting with a rear camera and/or shooting with a focal length greater than a preset focal length threshold, and face recognition is performed on the image to obtain the face region. Face recognition may be implemented by use of a face recognition algorithm in the related art. There are no specific limits made herein.

Each pixel in the image includes depth information, and depth information of the face region is determined according to the identified face region. Regions with depths similar to that of the face region is determined as candidate regions, and the region adjacent to the face region in the candidate regions is identified as the portrait region in the image.

In 102, a target white balance gain value is calculated according to an area occupied by the portrait region in the image.

Specifically, an area proportion of the portrait region in the image is calculated according to the area occupied by the portrait region in the image, and a first gain value and second gain value of each color component are calculated according to the area proportion to obtain the white balance gain value.

The first gain value is used to regulate a face in the image to a skin color.

Specifically, it is determined whether the skin color of the face in the image is a normal face skin color. When the skin color of the face in the image is not a normal face skin color, the first gain value capable of regulating the skin color of the face to the normal skin color is generated.

As a possible implementation mode, color components of all the pixels of the face region are acquired, a color of each pixel is represented by a color component (R, G, B), and the color vectors of each pixel may be averaged to calculate a color vector corresponding to the skin color of the face. It is determined whether R, G and B values corresponding to the skin color of the face are within the range of R, G and B values corresponding to the normal face skin color. When R, G and B values corresponding to the skin color of the face are not within the range of R, G and B values corresponding to the normal face skin color, the R, G and B values corresponding to the skin color of the face are adjusted through a gain value to be within the range of R, G and B values corresponding to the normal face skin color, and the gain value is the first gain value.

The range of R, G and B values corresponding to the normal face skin color may be determined according to R, G and B values provided in a color matrix CC. The R, G and B values in the color matrix CC may be obtained according to a CIE color space provided by the Commission Internationale de L'Eclairage.

The second gain value is different from the first gain value. The second gain value refers to a gain value determined according to the portrait region to adjust white balance and is calculated according to each color component in the portrait region.

As a possible implementation mode, when a color change in the colors of the image is enough, an average value of the three components R, G and B in the color vectors of all the pixels tends to be balanced (1:1:1), and a relatively accurate white balance gain value, i.e., the second gain value, may be obtained by a grayscale weighting algorithm.

Specifically, the portrait region is divided into a plurality of sub-blocks, color vectors of all pixels in each sub-block are acquired, and each pixel is represented by a color vector (R, G, B). Then an average value and standard deviation of three channels R, G and B in each sub-block are calculated, and the standard deviation of each sub-block is weighted (the low-correlated sub-blocks are discarded and the high-correlated sub-blocks are reserved) to reduce influence of a large-area single color and make the image colorful. An average value of the three channels R, G and B weighted with the standard deviation is further calculated, and a gain coefficient of the three channels R, G and B is calculated to obtain the second gain value.

In 103, white balance processing is performed on the image according to the target white balance gain value.

Specifically, Red (R) value and Blue (B) value data of each regulated pixel are calculated according to the calculated target white balance gain value, thereby achieving color correction.

It is to be noted that, since a human eye is most sensitive to light with a Green (G) light wavelength (480 nm-600 nm) in a frequency spectrum and the number of green pixels acquired in a Bayer array is greatest, a present camera usually fixes a gain value of a component G and then regulates gain values of a component R and a component B to regulate the component R and the component B respectively.

Furthermore, before the operation in 102, the method further includes the following operation. It is determined that the area occupied by the portrait region in the image is less than a preset area threshold.

This is because, when the portrait region is relatively small, the area of the face region is smaller, and in such case, if weights of the first gain value and the second gain value are regulated based on the area occupied by the face region in the image, a face skin color regulation does not have a significant effect. Responsive to determining that the area occupied by the portrait region in the image is less than the preset area threshold, it is necessary to adopt a calculation manner of calculating the target white balance gain value based on the area occupied the portrait region in the image instead.

It is to be understood that, when the area occupied by the portrait region in the image is less than the preset area threshold, it is indicated that the image is acquired in a distant shooting manner and is applied to an application scenario of the disclosure.

Specifically, there are multiple possible implementation modes for calculating the area occupied by the target region in the image. As a possible implementation mode, the image is divided into multiple sub-blocks, and each sub-block has the same area. For example, a target picture is divided into m*n sub-blocks, a length of each sub-block is 1/m of a length of the target picture, and a width of each sub-block is 1/n of a width of the target picture. Therefore, an area of each sub-block is 1/m*n, where m and n are positive integers, and preferably, m is 9 and n is 7.

Furthermore, the acquired m*n sub-blocks are searched for sub-blocks in a coordinate interval of the face region and sub-blocks including an edge of the coordinate interval of the face region to obtain all the sub-blocks in the face region. An area of each sub-block is known, so that the area of the face region may be calculated.

All sub-blocks in the portrait region may be found by the same method. An area of each sub-block is known, so that the area occupied by the portrait region in the image may be calculated.

It is determined whether the area occupied by the portrait region in the image is less than the preset area threshold. Responsive to determining that the area occupied by the portrait region in the image is less than the preset area threshold, it is necessary to adopt the calculation manner of calculating the target white balance gain value based on the area occupied by the portrait region in the image.

In a practical application scenario, there is another possible circumstance. The area of the portrait region in the acquired image is not small, and when it is determined that the area occupied by the portrait region in the image is not less than the preset area threshold, namely the area of the portrait region is relatively large, the area of the face region is correspondingly large. Under the circumstance, the effect of the face skin color regulation is more significant if the weights of the first gain value and the second gain value are adjusted based on the area occupied by the face region in the image. Therefore, responsive to determining that the area occupied by the portrait region in the image is not less than the preset area threshold, a calculation manner of calculating the target white balance gain value based on the area occupied by the face region in the image may also be adopted instead. In the white balance processing method of the embodiments of the disclosure, the portrait region in the image is identified, the target white balance gain value is calculated according to the area occupied by the portrait region in the image, and white balance processing is performed on the image according to the target white balance gain value. This solves the technical problems of inaccurate image color reproduction and poor user experience caused by the fact that in condition of a relatively long shooting distance, an area proportion of a face region in an image is relatively low when the white balance regulation is performed according to a white balance gain value determined based on an area occupied by the face region.

Figure 2:
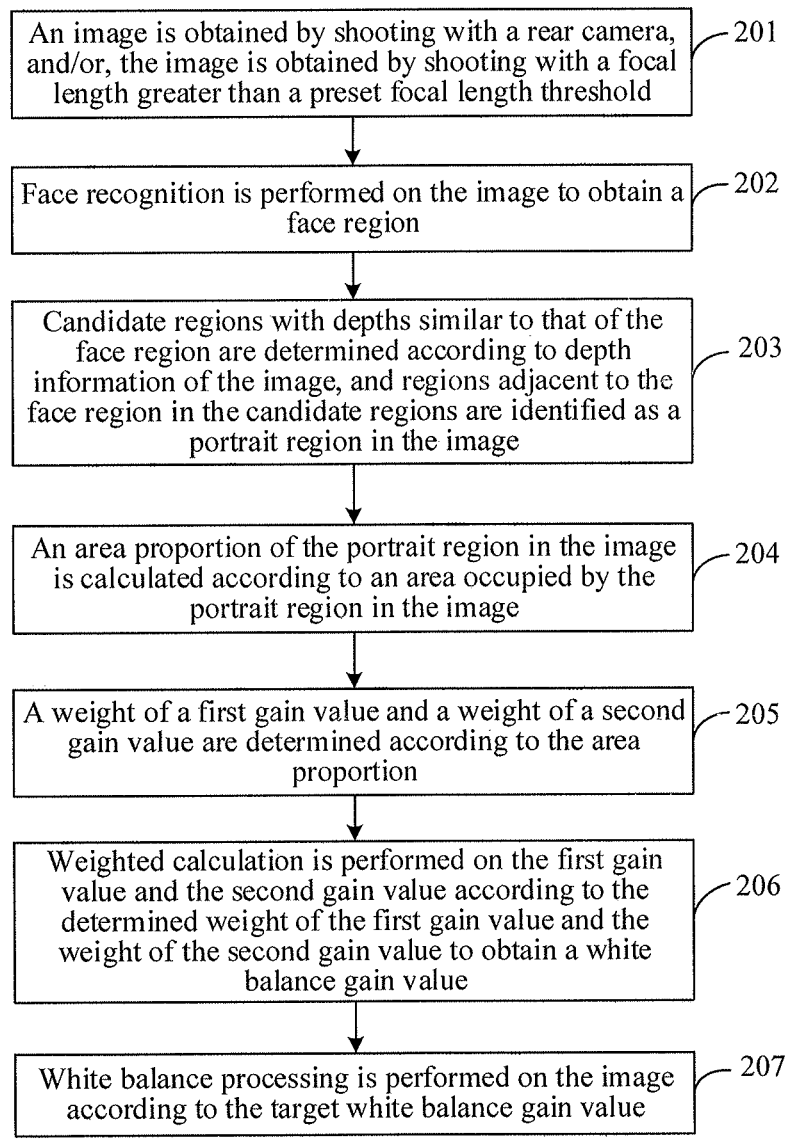
FIG. 2 is a schematic flowchart of another white balance processing method according to an embodiment of the disclosure.

For describing the previous embodiment clearly, the embodiments of the disclosure provide another possible white balance processing method. FIG. 2 is a flowchart of another white balance processing method according to an embodiment of the disclosure. The weights of the first gain value and the second gain value are determined according to the area proportion of the portrait region in the image, and a final white balance gain value is obtained by performing weighted calculation based on the weights. As illustrated in FIG. 2, the method includes the following operations.

In 201, an image is obtained by shooting with a rear camera, and/or, the image is obtained by shooting with a focal length greater than a preset focal length threshold.

Specifically, when the rear camera is adopted to shoot a portrait, a distance between the portrait and the camera is relatively long and an area proportion of a face in the image is relatively low, and/or, when the focal length greater than the preset focal length threshold is adopted to shoot the portrait, namely distant shooting is performed, the area occupied by the face in the obtained image is also relatively small.

It is to be noted that the rear camera may be a depth (Red-Green-Blue Depth, RGBD) camera or a structured light camera, may also be a dual camera or a Time of Flight (TOF) camera and will not be enumerated herein. Through these cameras, depth information of the shot image may be obtained.

In 202, face recognition is performed on the image to obtain a face region.

Specifically, the face in the image is identified through a face recognition technology to obtain a coordinate interval of the face region. There are multiple implementation manners for a face recognition algorithm in the related art. For example, an Adaboost model algorithm may be adopted for face recognition, and another algorithm capable of rapidly identifying the face region may also be adopted to identify the face region. The corresponding implementation manner for face recognition is not limited in the embodiments of the disclosure.

In 203, candidate regions with depths similar to that or the face region are determined according to depth information of the image, and the regions adjacent to the face region in the candidate regions are identified as a portrait region in the image.

The depth information indicates a distance between each pixel in the image and the camera.

Specifically, depth information corresponding to each pixel in the image is obtained. The depth information of the pixels corresponding to the face region may be determined according to the determined face region, and the pixels with depth information similar to that of the pixels corresponding to the face region are determined as candidate pixels. Regions formed by the candidate pixels are the candidate regions, and the regions adjacent to the face region in the candidate regions are identified as the portrait region in the image.

In 204, an area proportion of the portrait region in the image is calculated according to an area occupied by the portrait region in the image.

Specifically, a quotient obtained by dividing the area of the portrait region by a total area of the image is the area proportion of the portrait region in the image.

In 205, a weight of a first gain value and a weight of a second gain value are determined according to the area proportion.

Specifically, for convenient description, the weight of the first gain value is set to be K, and meanwhile, and the weight of the second gain value is determined to be 1-K. A value of K is determined according to the area proportion. In general, the area proportion is positively correlated to the value of K.

In 206, weighted calculation is performed on the first gain value and the second gain value according to the determined weight of the first gain value and the weight of the second gain value to obtain a white balance gain value.

Specifically, the first gain value and the second gain value are multiplied by the respective weights to calculate the white balance gain value, namely the white balance gain value=the first gain value*K+the second gain value*(1-K).

In 207, white balance processing is performed on the image according to the target white balance gain value.

Specifically, an R value and B value in each color component in the image are multiplied by the respective gain values in the white balance gain value according to the calculated white balance gain value to obtain R value and B value of the color component subjected to the white balance processing, so as to implement color adjustment of the image.

In the white balance processing method of the embodiments of the disclosure, the portrait region in the image is identified, the target white balance gain value is calculated according to the area occupied by the portrait region in the image, and white balance processing is performed on the image according to the target white balance gain value. This solves the technical problems of inaccurate image color reproduction and poor user experience caused by the fact that in condition of a relatively long shooting distance, an area proportion of a face region in an image is relatively low when the white balance regulation is performed according to a white balance gain value determined based on an area occupied by the face region.

For implementing the abovementioned embodiments, the disclosure also discloses a white balance processing device.

Figure 3:
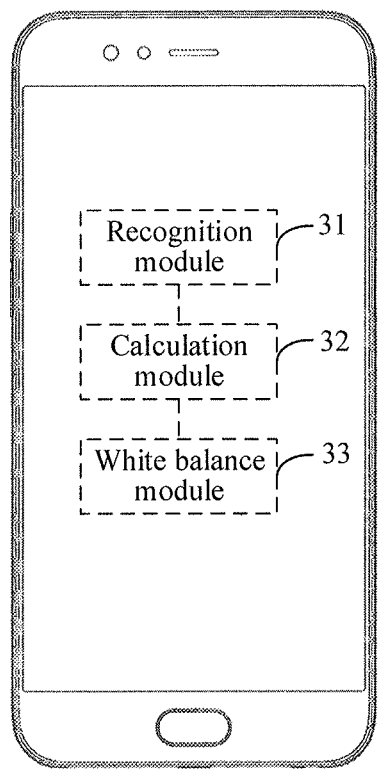
FIG. 3 is a structure diagram of a white balance processing device according to an embodiment of the disclosure.

FIG. 3 is a structure diagram of a white balance processing device according to an embodiment of the disclosure. As illustrated in FIG. 3, the device includes a recognition module 31, a calculation module 32 and a white balance module 33.

The recognition module 31 is configured to identify a portrait region in an image.

The calculation module 32 is configured to calculate a target white balance gain value according to an area occupied by the portrait region in the image.

The white balance module 33 is configured to perform white balance processing on the image according to the target white balance gain value.

As a possible implementation mode, the recognition module 31 is specifically configured to perform face recognition on the image to obtain a face region, determine candidate regions with depths similar to that of the face region according to depth information of the image and identify regions adjacent to the face region in the candidate regions as the portrait region in the image.

It is to be noted that explanations and descriptions about the method embodiments are also applied to the device of the embodiment and will not be elaborated herein.

In the white balance processing device of the embodiment, the recognition module is configured to identify the portrait region in the image, the calculation module is configured to calculate the target white balance gain value according to the area occupied by the portrait region in the image, and the white balance module is configured to perform white balance processing on the image according to the target white balance gain value. When a rear camera is adopted to shoot a portrait, the area of the portrait region in the image is relatively large, and thus the target white balance gain value of the image is calculated according to the area occupied by the portrait region. This solves the technical problems of inaccurate imago color reproduction and poor user experience caused by the fact that an area proportion of a face region in an image is relatively low when the white balance regulation is performed according to a white balance gain value determined based on an area occupied by the face region.

Figure 4:
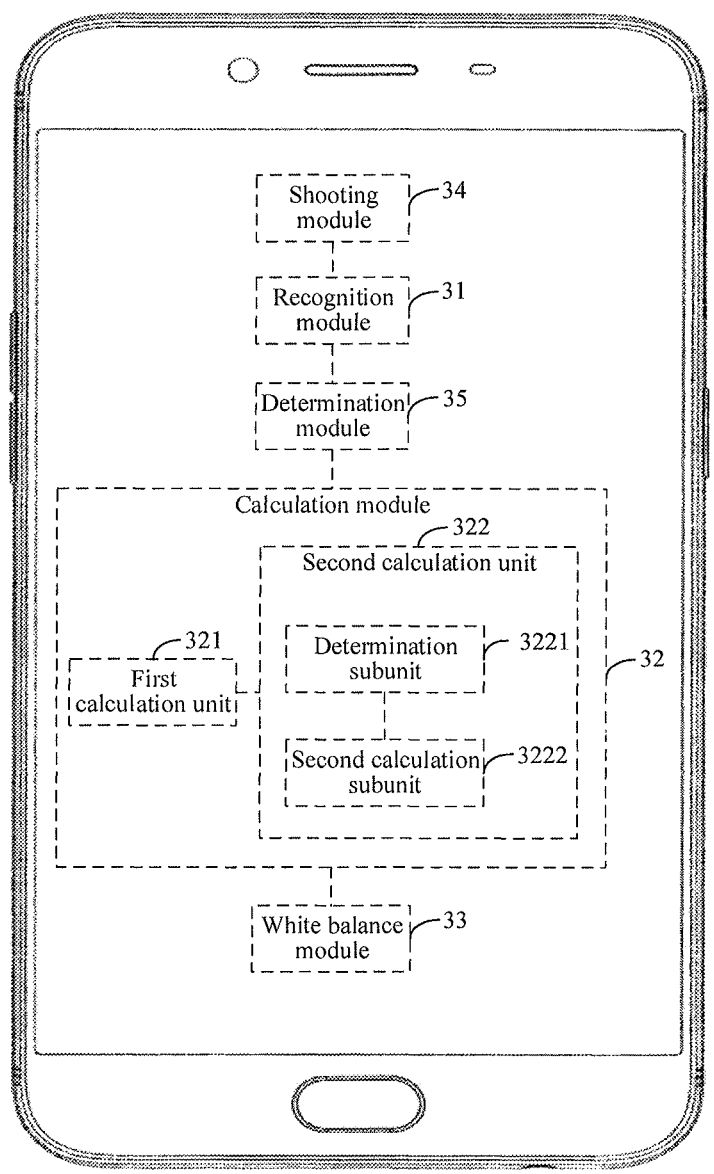
FIG. 4 is a structure diagram of another white balance processing device according to an embodiment of the disclosure.

Based on the abovementioned embodiments, an embodiment of the disclosure also provides a possible implementation mode of a white balance processing device. FIG. 4 is a structure diagram of another white balance processing device according to an embodiment of the disclosure. Based on the previous embodiments, the device further includes a shooting module 34 and a determination module 35.

The shooting module 34 is configured to obtain the image by, shooting with a rear camera, and/or, obtain the image by shooting with a focal length greater than a preset focal length threshold.

The determination module 35 is configured to determine that the area occupied by the portrait region in the image is less than a preset area threshold.

As a possible implementation mode, the calculation module 32 may further include a first calculation unit 321 and a second calculation unit 322.

The first calculation unit 321 is configured to calculate an area proportion of the portrait region in the image according to the area occupied by the portrait region in the image.

The second calculation unit 322 is configured to calculate a first gain value and a second gain value of each color component according to the area proportion to obtain the white balance gain value. The first gain value is used to regulate a face in the image to a skin color and the second gain value is different from the first gain value.

As a possible implementation mode, the second calculation unit 322 may further include a determination subunit 3221 and a second calculation subunit 3222.

The determination subunit 3221 is configured to determine a weight of the first gain value and a weight of the second gain value according to the area proportion.

The second calculation subunit 3222 is configured to perform weighted calculation on the first gain value and the second gain value according to the determined weight of the first gain value and the weight of the second gain value to obtain the white balance gain value.

As a possible implementation mode, the device further includes a determination and calculation module.

The determination and calculation module is configured to, when the area occupied by the portrait region in the image is not less than the preset area threshold, calculate the target white balance gain value according to an area occupied by a face region in the image.

As a possible implementation mode, the device further includes an acquisition module.

The acquisition module is configured to perform synchronization imaging between a structured light camera or a depth camera and the camera for obtaining the image to obtain the depth information of the image.

It is to be noted that the explanations and descriptions about the method embodiments are also applied to the device of the embodiments and will not be elaborated herein.

In the white balance processing device of the embodiments, the recognition module is configured to identify the portrait region in the image, the calculation module is configured to calculate the target white balance gain value according to the area occupied by the portrait region in the image, and the white balance module is configured to perform white balance processing on the image according to the target white balance gain value. When the rear camera is adopted to shoot the portrait, the area of the portrait region in the image is relatively large, and the target white balance gain value of the image is calculated according to the area occupied by the portrait region. This solves the technical problems of inaccurate image color reproduction and poor user experience caused by the fact that an area proportion of a face region in an image is relatively low when the white balance regulation is performed according to a white balance gain determined based on an area occupied by the face region. For implementing the abovementioned embodiments, the disclosure also discloses another device, which includes a processor and a memory configured to store an instruction executable for the processor.

For implementing the abovementioned embodiments, the disclosure also discloses a computer device, which includes a memory, a processor and a computer program stored in the memory and capable of running in the processor. The processor executes the program to implement the white balance processing method of the method embodiments.

Figure 5:
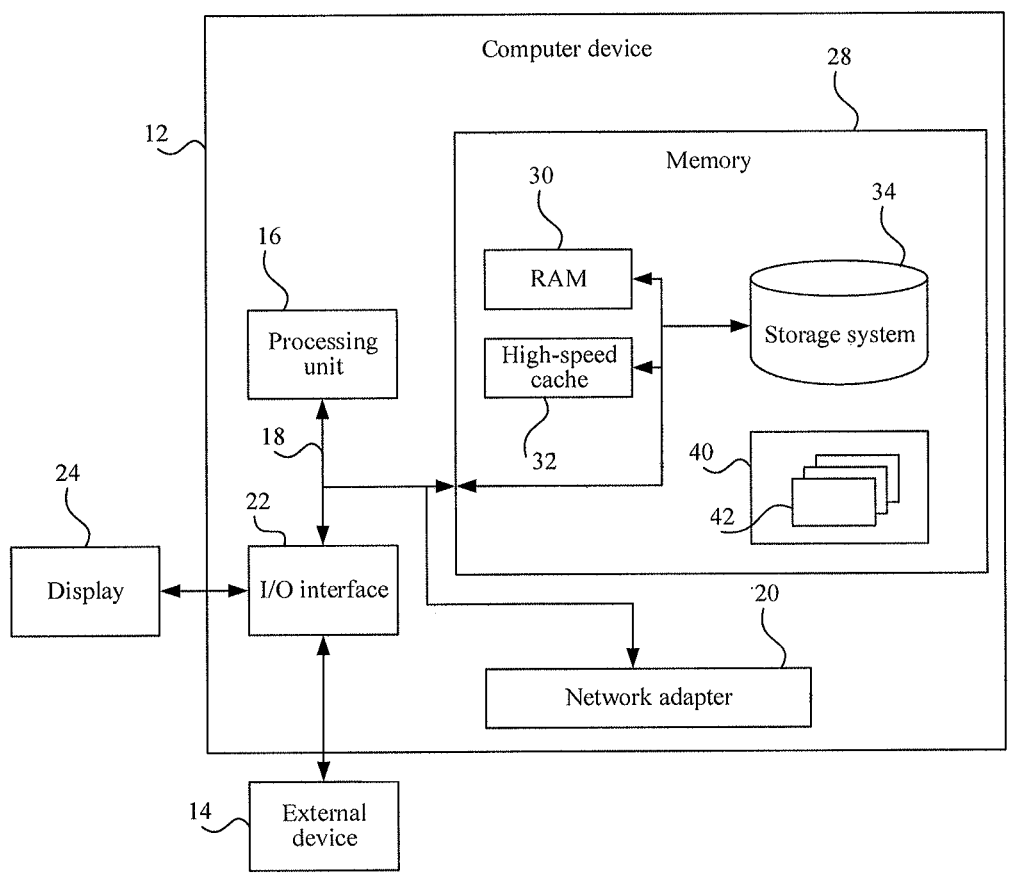
FIG. 5 is a block diagram of an exemplary computer device suitable for implementing implementation modes of the disclosure.

FIG. 5 is a block diagram of an exemplary computer device suitable for implementing implementation modes of the disclosure. The computer device 12 illustrated in FIG. 5 is only an example and should not form any limit to functions and scope of application of the embodiments of the disclosure.

As illustrated in FIG. 5, the computer device 12 is embodied in form of a universal computer device. Components of the computer device 12 may include, but not limited to: one or more processors or processing units 16, a system memory 28 and a bus 18 connecting different system components (including the system memory 28 and the processing unit 16).

The bus 18 represents one or more of several types of bus structures, including a memory bus or memory controller, a peripheral bus, an accelerated graphics port, a processor or a local bus adopting any bus structure in multiple bus structures. For example, these system structures include, but not limited to, an Industry Standard Architecture (ISA) bus, a Micro Channel Architecture (MAC) bus, an enhanced ISA bus, a Video Electronics Standards Association (VESA) local bus and a Peripheral Component Interconnection (PCI) bus.

The computer device 12 typically includes multiple computer system-readable media. These media may be any available medium that the computer device 12 may access, including volatile and nonvolatile media and movable and immovable media.

The memory 28 may include a computer system-readable medium in form of a nonvolatile memory, for example, a Random Access Memory (RAM) 30 and/or a high-speed cache memory 32. The computer device 12 may further include another movable/immovable and volatile/nonvolatile computer system storage medium. Only as an example, a storage system 34 may be configured to read and write an immovable and nonvolatile magnetic medium (not illustrated in FIG. 5 and usually called a "hard disk drive"). Although not illustrated in FIG. 5, a magnetic disk drive configured to read and write a movable nonvolatile magnetic disk (for example, a "floppy disk") and an optical disk drive configured to read and write a movable nonvolatile optical disk (for example, a Compact Disc Read Only Memory (CD-ROM), a Digital Video Disc Read Only Memory (DVD-ROM) or another optical medium) may be provided. Under such circumstances, each drive may be connected with the bus 18 through one or more data medium interfaces. The memory 28 may include at least one program product. The program product includes a group of (for example, at least one) program modules, and these program modules are configured to execute the functions of each embodiment of the disclosure.

A program/utility tool 40 with a group of (at least one) program modules 42 may be stored in, for example, the memory 28. Such a program module 42 includes, but not limited to, an operating system, one or more application programs, another program module and program data, and each or certain combination of these examples may include implementation of a network environment. The program module 42 usually executes the functions and/or method in the embodiments described in the disclosure.

The computer device 12 may also communicate with one or more external devices 14 (for example, a keyboard, a pointing device and a display 24), and may further communicate with one or more devices through which a user may interact with the computer device 12 and/or communicate with any device (for example, a network card and a modem) through which the computer device 12 may communicate with one or more other computer devices. Such communication may be implemented through an Input/Output (I/O) interface 22. Moreover, the computer device 12 may further communicate with one or more networks (for example, a Local Area Network (LAN) and a Wide Area Network (WAN) and/or public network, for example, the Internet) through a network adapter 20. As illustrated in FIG. 5, the network adapter 20 communicates with the other modules of the computer device 12 through the bus 18. It is to be understood that, although not illustrated in the figure, other hardware and/or software modules may be used in combination with the computer device 12, including, but not limited to, a microcode, a device driver, a redundant processing unit, an external disk drive array, a Redundant Array of Independent Disks (RAID) system, a magnetic tape drive, a data backup storage system and the like.

The processing unit 16 runs the program stored in the system memory 28, to execute various function applications and data processing, for example, implementing the white balance processing method mentioned in the abovementioned embodiments.

For implementing the abovementioned embodiments, the disclosure also discloses a computer-readable storage medium, in which a computer program is stored. The program is executed by a processor to implement the white balance processing method in the abovementioned method embodiments.

For implementing the abovementioned embodiments, the disclosure also discloses a computer program product. An instruction in the computer program product is executed by a processor to implement the white balance processing method in the abovementioned method embodiments.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. The specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or operations of the process and, moreover, the scope of the preferred implementation mode of the disclosure includes other implementation, not in a sequence illustrated or discussed herein, including execution of the functions basically simultaneously or in an opposite sequence according to the involved functions. This should be understood by those skilled in the art of the embodiments of the disclosure.

Logics and/or operations represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a RAM, a Read-Only Memory (ROM), an Erasable Programmable ROM (EPROM) (or flash memory), an optical fiber device and a portable CD-ROM. In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple operations or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the operations in the method of the abovementioned embodiment may be completed through related hardware instructed by a program. The program may be stored in a computer-readable storage medium, and when the program is executed, one or combination of the operations of the method embodiments is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a ROM, a magnetic disk, an optical disk or the like. The embodiments of the disclosure have been illustrated or described above. It can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A white balance processing method, comprising:
performing face recognition on an image to obtain a face region;
determining candidate regions with depths similar to that of the face region according to depth information of the image, and identifying a region adjacent to the face region in the candidate regions as a portrait region in the image, the portrait region comprising the face region and a body region;
determining that an area occupied by the portrait region in the image is less than a preset area threshold;
calculating, when the area occupied by the portrait region in the image is not less than the preset area threshold, a target white balance gain value according to an area occupied by the face region in the image;
calculating, when the area occupied by the portrait region in the image is less than the preset area threshold, a target white balance gain value according to the area occupied by the portrait region in the image; and
performing white balance processing on the image according to the target white balance gain value.

2. The white balance processing method of claim 1, wherein calculating the target white balance gain value according to the area occupied by the portrait region in the image comprises:
calculating an area proportion of the portrait region in the image according to the area occupied by the portrait region in the image; and
calculating a first gain value and a second gain value of each color component according to the area proportion to obtain the target white balance gain value, the first gain value being used to regulate a face in the image to a skin color and the second gain value being different from the first gain value.

3. The white balance processing method of claim 2, wherein calculating the first gain value and the second gain value of each color component according to the area proportion to obtain the target white balance gain value comprises:

determining a weight of the first gain value and a weight of the second gain value according to the area proportion; and performing weighted calculation on the first gain value and the second gain value according to the determined weight of the first gain value and the weight of the second gain value to obtain the target white balance gain value.

4. The white balance processing method of claim 1, wherein before identifying the portrait region in the image, the method further comprises at least one of the following:
   obtaining the image by shooting with a rear camera;
   or, obtaining the image by shooting with a focal length greater than a preset focal length threshold.

5. A computer device, comprising a memory, a processor and a computer program stored in the memory and capable of running in the processor, wherein the processor executes the program to implement a white balance processing method, the method comprising:
   performing face recognition on an image to obtain a face region;
   determining candidate regions with depths similar to that of the face region according to depth information of the image, and identifying a region adjacent to the face region in the candidate regions as a portrait region in the image, the portrait region comprising the face region and a body region;
   determining that an area occupied by the portrait region in the image is less than a preset area threshold;
   calculating, when the area occupied by the portrait region in the image is not less than the preset area threshold, a target white balance gain value according to an area occupied by the face region in the image;
   calculating, when the area occupied by the portrait region in the image is less than the preset area threshold, a target white balance gain value according to the area occupied by the portrait region in the image; and
   performing white balance processing on the image according to the target white balance gain value.

6. A non-transitory computer-readable storage medium, having a computer program stored thereon, wherein the program is executed by a processor to implement a white balance processing method, the method comprising:
   performing face recognition on an image to obtain a face region;
   determining candidate regions with depths similar to that of the face region according to depth information of the image, and identifying a region adjacent to the face region in the candidate regions as a portrait region in the image, the portrait region comprising the face region and a body region;
   determining that an area occupied by the portrait region in the image is less than a preset area threshold;
   calculating, when the area occupied by the portrait region in the image is not less than the preset area threshold, a target white balance gain value according to an area occupied by the face region in the image;
   calculating, when the area occupied by the portrait region in the image is less than the preset area threshold, a target white balance gain value according to the area occupied by the portrait region in the image; and
   performing white balance processing on the image according to the target white balance gain value.

7. The white balance processing method of claim 2, wherein before identifying the portrait region in the image, the method further comprises at least one of the following:
   obtaining the image by shooting with a rear camera;
   or, obtaining the image by shooting with a focal length greater than a preset focal length threshold.

8. The white balance processing method of claim 3, wherein before identifying the portrait region in the image, the method further comprises at least one of the following:
   obtaining the image by shooting with a rear camera;
   or, obtaining the image by shooting with a focal length greater than a preset focal length threshold.

9. The computer device of claim 5, wherein the processor executes the program to implement the following operations:
   calculating an area proportion of the portrait region in the image according to the area occupied by the portrait region in the image; and
   calculating a first gain value and a second gain value of each color component according to the area proportion to obtain the target white balance gain value, the first gain value being used to regulate a face in the image to a skin color and the second gain value being different from the first gain value.

10. The computer device of claim 9, wherein the processor executes the program to implement the following operations:
    determining a weight of the first gain value and a weight of the second gain value according to the area proportion; and
    performing weighted calculation on the first gain value and the second gain value according to the determined weight of the first gain value and the weight of the second gain value to obtain the target white balance gain value.

11. The computer device of claim 5, wherein the processor executes the program to implement at least one of the following operations:
    obtaining the image by shooting with a rear camera;
    or, obtaining the image by shooting with a focal length greater than a preset focal length threshold.

12. The computer device of claim 9, wherein the processor executes the program to implement at least one of the following operations:
    obtaining the image by shooting with a rear camera;
    or, obtaining the image by shooting with a focal length greater than a preset focal length threshold.

13. The computer device of claim 10, wherein the processor executes the program to implement at least one of the following operations:
    obtaining the image by shooting with a rear camera;
    or, obtaining the image by shooting with a focal length greater than a preset focal length threshold.

14. The non-transitory computer-readable storage medium of claim 6, wherein the program is executed by a processor to implement the following operations:
    calculating an area proportion of the portrait region in the image according to the area occupied by the portrait region in the image; and
    calculating a first gain value and a second gain value of each color component according to the area proportion to obtain the target white balance gain value, the first gain value being used to regulate a face in the image to a skin color and the second gain value being different from the first gain value.

15. The non-transitory computer-readable storage medium of claim 14, wherein the program is executed by a processor to implement the following operations:
    determining a weight of the first gain value and a weight of the second gain value according to the area proportion; and performing weighted calculation on the first gain value and the second gain value according to the determined weight of the first gain value and the weight of the second gain value to obtain the target white balance gain value.

16. The non-transitory computer-readable storage medium of claim 6, wherein the program is executed by a processor to implement at least one of the following operations:
  obtaining the image by shooting with a rear camera;
  or, obtaining the image by shooting with a focal length greater than a preset focal length threshold.

17. The non-transitory computer-readable storage medium of claim 14, wherein the program is executed by a processor to implement at least one of the following operations:
  obtaining the image by shooting with a rear camera;
  or, obtaining the image by shooting with a focal length greater than a preset focal length threshold.

18. The non-transitory computer-readable storage medium of claim 15, wherein the program is executed by a processor to implement at least one of the following operations:
  obtaining the image by shooting with a rear camera;
  or, obtaining the image by shooting with a focal length greater than a preset focal length threshold.

* * * * *